(12) United States Patent
Schryer et al.

(10) Patent No.: US 8,660,019 B2
(45) Date of Patent: Feb. 25, 2014

(54) SYSTEM AND METHOD FOR CONFIGURING MEDIA NETWORK RESOURCES

(75) Inventors: Norman L. Schryer, New Providence, NJ (US); Thomas Killian, Westfield, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 539 days.

(21) Appl. No.: 11/746,661

(22) Filed: May 10, 2007

(65) Prior Publication Data

US 2008/0279112 A1    Nov. 13, 2008

(51) Int. Cl.
*G01R 31/08* (2006.01)
*G06F 15/173* (2006.01)
*G06F 15/16* (2006.01)

(52) U.S. Cl.
USPC ............................. 370/252; 709/223; 709/232

(58) Field of Classification Search
USPC ........................... 370/254–255; 709/220–222
See application file for complete search history.

(56) References Cited

U.S. PATENT DOCUMENTS

| | | | |
|---|---|---|---|
| 2003/0025735 A1* | 2/2003 | Polgar et al. | 345/771 |
| 2003/0140131 A1* | 7/2003 | Chandrashekhar et al. | 709/223 |
| 2003/0235209 A1* | 12/2003 | Garg et al. | 370/468 |
| 2004/0064575 A1* | 4/2004 | Rasheed et al. | 709/232 |
| 2006/0083193 A1* | 4/2006 | Womack et al. | 370/328 |
| 2006/0251229 A1 | 11/2006 | Gorti et al. | |
| 2007/0161411 A1* | 7/2007 | Liao et al. | 455/566 |
| 2007/0245261 A1* | 10/2007 | Bukovec et al. | 715/810 |

* cited by examiner

*Primary Examiner* — Brandon Renner
(74) *Attorney, Agent, or Firm* — Guntin & Gust, PLC; Ed Guntin (57) ABSTRACT

A system and method for configuring media resources is disclosed. A system that incorporates teachings of the present disclosure may include, for example, a network element having a controller element to present a graphical user interface (GUI) to identify available configuration settings for one or more self-describing services offered to one or more media devices in the network, and manage a network connectivity of the media devices in the network to receive the one or more self-describing services in accordance with a selection of the available configuration settings. Additional embodiments are disclosed.

31 Claims, 4 Drawing Sheets

SYSTEM AND METHOD FOR CONFIGURING MEDIA NETWORK RESOURCES

FIELD OF THE DISCLOSURE

The present disclosure relates generally to media systems, and more specifically to a system and method for configuring media network resources.

BACKGROUND

Setting up media resources in a home network or business computer network for media services can be a daunting experience. A user is generally burdened with the responsibility of manually configuring the media resources to receive the media service. Moreover, the user is not generally aware of the media service requirements, nor the capabilities of the media resources to satisfy the media service requirements. Configuration typically occurs when a network is first established or as upgrades to the network occur, which can result in inefficient use of available resources at other times.

A need therefore arises for a system and method for configuring media network resources.

DETAILED DESCRIPTION

Embodiments in accordance with the present disclosure provide a system and method for configuring media network resources.

In a first embodiment of the present disclosure, a computer-readable storage medium can have computer instructions for querying a network component for connectivity requests presented by one or more self-describing services offered to one or more media devices in a network, presenting a graphical user interface (GUI) to identify configuration settings available to the one or more media devices requesting the self-describing services, receiving a selection for an applied configuration setting from the configuration settings available, and managing a network connectivity of the media devices to receive the one or more self-describing services from the network component in accordance with the applied configuration setting.

In a second embodiment of the present disclosure, a network element can have a controller element to present a graphical user interface (GUI) to identify available configuration settings for one or more self-describing services offered to one or more media devices in the network, and manage a network connectivity of the media devices in the network to receive one or more self-describing services in accordance with a selection of the available configuration settings.

In a third embodiment of the present disclosure, a media device can have a controller element to present a graphical user interface (GUI) to identify configuration settings associated with a connectivity of a self-describing service that is available to the media device.

In a fourth embodiment of the present disclosure, a method for configuring media network resources can include identifying connectivity requirements of a self-describing service, determining configuration settings of the media network resources that at least in part satisfy a portion of the connectivity requirements, and presenting a graphical user interface (GUI) to identify the configuration settings available to the media network resources for receiving the self-describing service.

Figure 1:
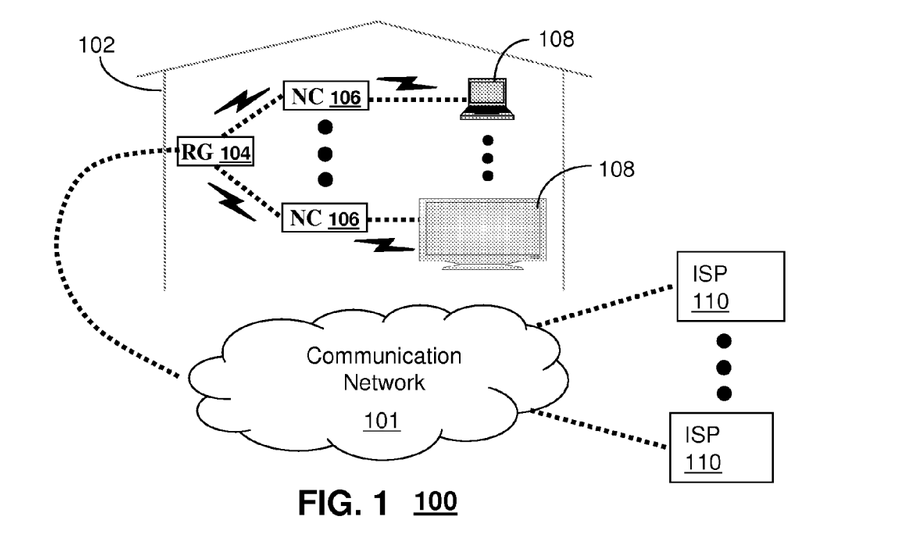
FIG. 1 depicts an exemplary embodiment of a media network.

FIG. 1 depicts an exemplary embodiment of a media network 100. The media network 100 can comprise one or more Internet Service Providers (ISPs) 110 that provide media services to a residence 102 through a communications network 101. The present disclosure contemplates residence 102 including a commercial setting or other location, where media services are provided, but for illustrative purposes the location will be referred to as a residence. The present disclosure also contemplates the residence 102 being a plurality of locations, such as a local area network comprising a plurality of buildings that receive media services.

The residence 102 can include a common residential gateway (RG) 104 that exchanges unicast or multicast signals with the ISPs 110 over the communication network 101. The RG 104 can distribute a portion of said signals to one or more network components or elements 106 used for presenting media services to a media device 108, such as a computer, analog or digital television (e.g., plasma TV), cell phone, portable music player, printer, fax machine, or media controller. The network component 106 can be a set-top box, router, access point, server, firewall, residential gateway, a switch and any other component that facilitates communication over the network 100.

In one aspect, RG 104 can provide port translation thereby allowing all the media devices 108 in the residence 102 to share one Internet Protocol (IP) address and Internet connection. The RG 104 can also integrate functionalities of the network component 106 singly or in combination. For example, RG 104 can include a modem (e.g., cable or DSL) that combines functions of an IP router, multi-port Ethernet switch and Wi-Fi access point.

The communication network 101 can comprise a number of common network elements interconnected by wired and/or wireless interfaces that support packet-switched and/or circuit-switched technologies. The communications network 101 can thus offer to the residence 102 Internet and/or traditional voice services such as, for example, POTS (Plain Old Telephone Service), VoIP (Voice over Internet Protocol), IPTV (Internet Protocol Television), broadband communications (e.g., cable, HDTV, xDSL, Ethernet), cellular telephony (e.g., CDMA, GSM), wireless broadband communications (e.g., Software Defined Radio, Ultra Wide Band, WiFi, WiMax, etc.), as well as other known or next generation technologies.

The one or more ISPs 110 can provide any analog media service and/or digital media service, such as presented by satellite, cable, and telecommunication service providers. Media services can include without limitation voice, moving images (e.g., high definition, standard or streaming video), still images (e.g., JPEGs), audio entertainment (e.g., MP3, or streaming audio), or any form of data services. A portion of digital media services can also be presented by way of a common IPTV system which can deliver television and/or video signals distributed to consumers by way of a broadband connection to the residence 102. In one arrangement, network elements in the communication network 100 can provide xDSL ports to the RG 104. In the present context, xDSL ports can mean any present or future derivative of a digital subscriber line (e.g., VDSL, ADSL, and so on).

Figure 2:
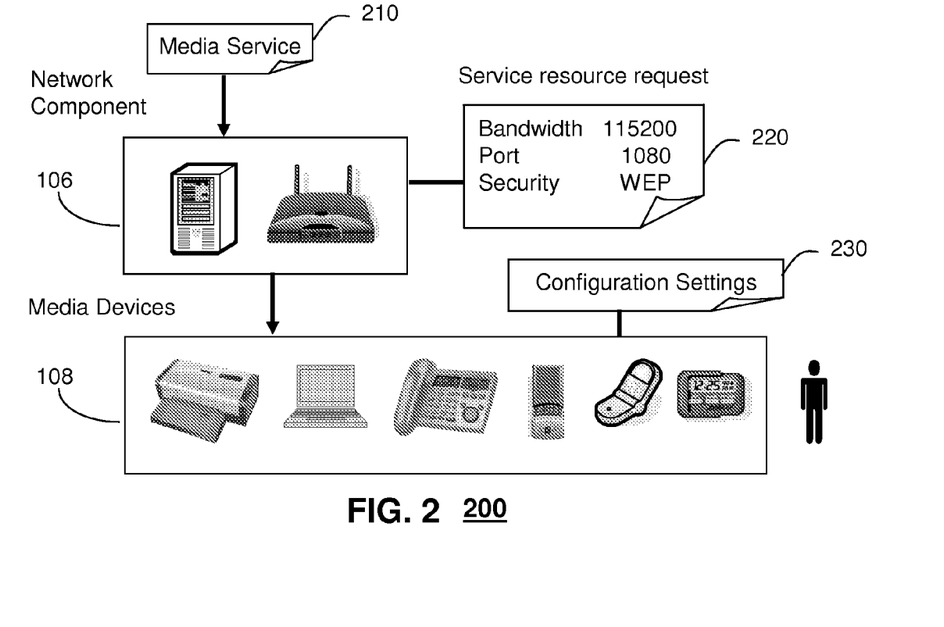
FIG. 2 depicts an exemplary embodiment for configuring a resource of the media network.

FIG. 2 depicts an exemplary embodiment for configuring a media resource (e.g., RG 104, NC 106, media devices 108) in the media network 100 to receive a media service 210. The media service 210 can be a self-describing service that presents, for example, in a service resource request 220, a connectivity that the service 210 requires or requests (e.g., bandwidth, connectivity, port, security) for presentation. The media devices 108 can each have a corresponding configuration setting 230 that identifies media device capabilities for providing the connectivity requests. The network component 106 can manage configuration settings 230 of the one or more media devices 108 in the network 100 for receiving the media service 210 in view of applied configuration settings.

Figure 3:
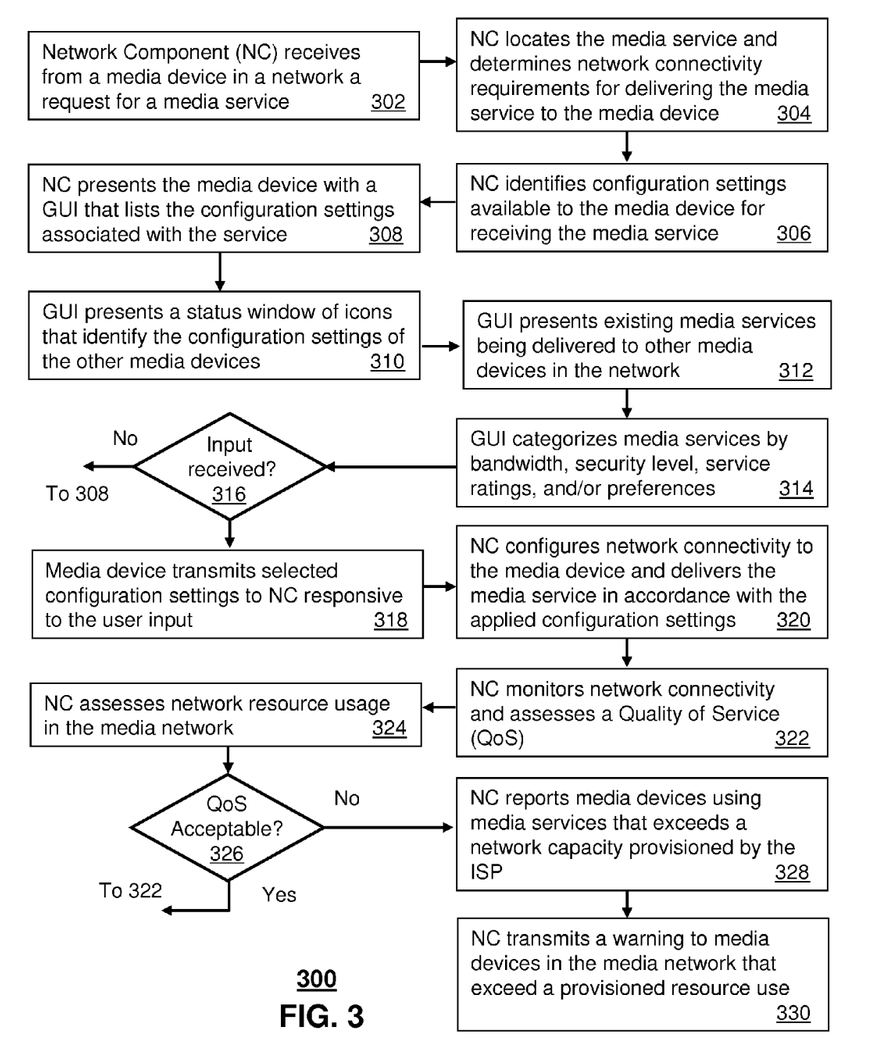
FIG. 3 depicts an exemplary method operating in the media network.

FIG. 3 depicts an exemplary embodiment of a method 300 operating in portions of the media network 100. The method 300 can be practiced with more or less than the number of steps shown. Moreover, the method 300 is not limited to the order of steps shown. Reference will be made to FIGS. 1 and 2 when describing the method 300, although it should be noted that the method 300 can be practiced in any other suitable system. It would be apparent to an artisan with ordinary skill in the art that other embodiments not depicted in FIG. 3 are possible without departing from the scope of the claims described below.

Method 300 can begin with step 302 in which the Network Component (NC) 106 receives from a media device 108 in the media network 100 a request for a media service 210. The media service 210 can be an MP3 audio streaming service, an MPEG video streaming service, a text messaging service, a broadcast service, a video-on-demand service, a pay-per-view service, a file sharing service, or any other media service. As an example, a user operating the media device 108 can request a download of an MP3 song from the Internet, request a Wi-Fi connection to a laptop in the media network 100, or request media content from a set-top box in the media network 100.

At step 304, the NC 106 locates the media service and determines network connectivity requirements for delivering the media service 210 to the media device 108. The media service 210 can be a self-describing service that identifies the connectivity requirements used for providing the media service 210. As shown in FIG. 2, the media service 210 can present a service resource request 220 that identifies connectivity requirements (e.g., bandwidth, address, port, security). For example, the service resource request 220 can indicate that an MP3 song can be downloaded from mp3songs.com and requires at least 1 Mbps of bandwidth for continuous streaming to port http://1080. The NC 106 can receive the media service 210 (e.g., MP3 download service) from one or more of the ISPs 110 across the communication network 101.

At step 306, the NC 106 identifies configuration settings available to the media device 108 for receiving the media service 210. As an example, the configuration settings can be a port setting (e.g., COM1, USB, port 1080), bandwidth settings (e.g., 3 Mbps), physical addresses (e.g., X:F67A), logical addresses (e.g., IP address) download settings (e.g., mono, 16 bit), and/or security setting (e.g., WEP encryption) of the media device 108. The NC 106 can identify the configuration settings of the media device 108 that correspond to the connectivity requirements requested by the media service 210. For instance, in the MP3 song download example, the NC 106 can identify the media device configuration settings (e.g., mono/stereo, 16 bits, 1 Mbps, etc.) particular to an audio media service specified in the service resource request 220.

In response to identifying the connectivity requirements (e.g., step 304) of the media service 210 and the configuration settings (e.g., step 306) available to the media device 108 for receiving the media service, the NC 106 at step 308 can present the media device 108 with a GUI that lists the configuration settings associated with the connectivity requirements of the media service 210.

Figure 4:
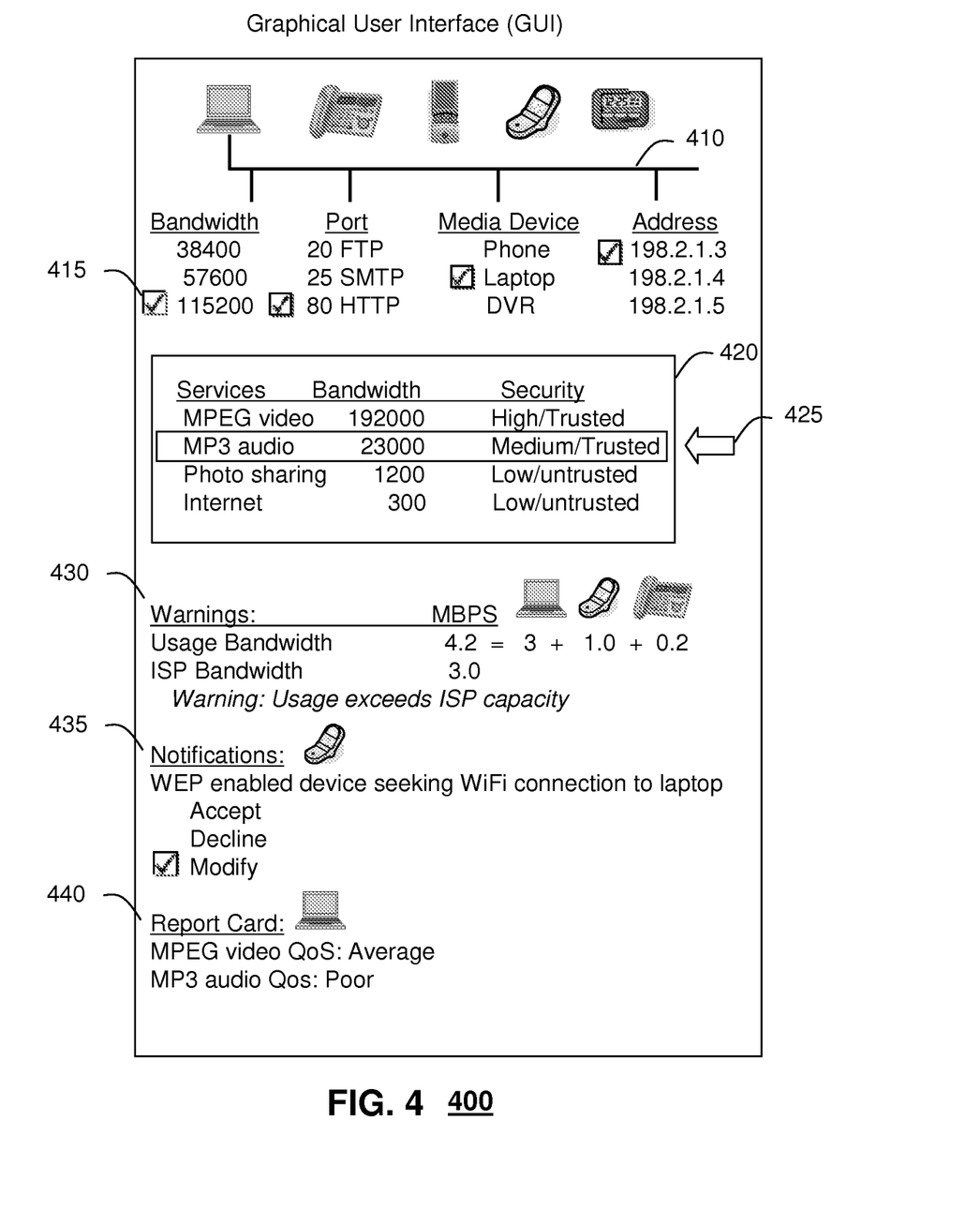
FIG. 4 depicts a Graphical User Interface operating in the media network.

Referring additionally to FIG. 4, an exemplary GUI 400 is shown that presents configuration settings 415 available to the media device 108 (e.g., a laptop) requesting the media service 210. The configuration settings 415 are shown for a laptop since the user in the current example is requesting the MP3 audio streaming service on the laptop. The configuration settings 415 can include media device port settings, bandwidth settings, physical addresses, logical addresses, download settings, and security settings, to name a few. The GUI 400 can present to the user an option to accept or decline a media service request such as one to access or use network resources.

The GUI 400 can present a status window of icons 410 for other media devices 108 in the media network 100, as shown in step 310. Each icon 410 can represent the configuration settings 415 of the one or more media devices 108, thereby allowing the user to identify other media devices 108 in the media network 100 that are utilizing media resources. The GUI 400 can be displayed on the media device 108 requesting the media service 210, and/or any of the other media devices in the media network 100.

The GUI 400 can also present a status window 420 of existing media services being delivered to the other media devices 108 in the media network 100, as shown in step 312. That is, in addition to identifying the connectivity status 425 for the currently requested media service 210 (e.g., MP3 song download on the laptop), the GUI 400 can also display other existing media services 210 utilizing media resources (e.g., bandwidth, ports) of other media devices in the media network 100. This allows the user of the media device 108, as well as other users of media devices, to inquire about media resource usage in the media network 100. As shown in step 314 and in FIG. 4, the GUI 400 can categorize media services 420, for example, by bandwidth, security level, service ratings, or any combination thereof.

The NC 106 can also implement security policies to minimize malware, adware, spyware, and/or phishing. The NC 106 can then accept, reject, or modify a service request for a network resource, for example, in view of the security policies. For instance, the NC 106 can check certifications and rate media services based on a security level (e.g., high/trusted), for example, by peers in the media network 100, certifications, consumer feedback reports, or reporting agencies. This additional layer of security can prevent non-trusted media services from fraudulently acquiring sensitive information (e.g., usernames, passwords) from users in the media network 100, or presenting malicious media services.

Notably, the GUI 400 can identify configuration settings available to the media device 108 that are associated with the connectivity requirements of the media service 210. In such regard, in one embodiment the user can visually select a configuration setting 415 to receive the media service 210 without inspecting the connectivity requirements of the media service 210, or inspecting the media device 108 capabilities for receiving the media service 210. The GUI 400 can also propose configuration settings that result in a best media quality (e.g., voice/video quality) in view of media resource consumption in the media network 100. As one example, the GUI 400, in view of current bandwidth usage in the media network 100, can identify which configuration settings exceed a bandwidth capacity provisioned by an ISP 110, and suggest other configuration settings that are within the bandwidth capacity.

Upon the media device 108 displaying the GUI 400, the NC 106 at step 316 can determine if a user input was received, and proceed to manage the network connectivity of the media device 108 in accordance with the user input. For example, the GUI 400 upon the NC 106 receiving a request from the media device 108 for an MP3 download, can present a pull-down list in the connectivity status 425 window, or a choice-group menu, of bandwidths (e.g., 119200, 23000, 1200) and/or audio parameters (e.g., mono/stereo, 16/32 bit, etc) the media device 108 supports for receiving the media service. The user can select the configuration settings from the list to receive the MP3 download. The user input for selecting the configuration settings 415 can be received via common interface elements of the media device 108 (e.g., keypad, touchscreen).

At step 318, the media device 108, upon receiving the applied configuration settings, can transmit the selected configuration settings 415 to the NC 106 responsive to the user input. At step 320, the NC 106 can configure network connectivity to the media device 108 and can deliver the media service 210 in accordance with the applied configuration settings 415. As an example, the NC 106 can open a socket stream connection with configuration settings (e.g., bandwidth, port, address) selected by the user in the GUI 400 for streaming MP3 audio. As another example, the NC 106 can adjust one or more security settings of a firewall to allow an authorized media service access to one or more media resources.

Upon connecting the media service 210 to the media device 108, the NC 106 at step 322 can monitor network connectivity and assess a Quality of Service (QoS). The QoS identifies the quality of the service received by the media device 108, such as the audio quality (e.g., bits per second) or the video quality (e.g., 32 bit, 20 frames per second). More specifically at step 324, the NC 106 can assess network resource usage in the media network 100. The NC 106 can determine an effective bandwidth used by the media devices 108, determine an average bandwidth supplied by an Internet Service Provider (ISP) 110, and present in the status window 420 the effective bandwidth, the average bandwidth, and a difference in the effective bandwidth and the average bandwidth. The NC 106, by way of the GUI 400, can also present a notifications window 435 of media devices in the media network 100 attempting to receive, or request, media services. The user can then accept, reject, or modify the service request for a network resource.

If at step 326 the NC 106 determines that the QoS in view of the network resource usage is acceptable, the NC 106 can continue to monitor the network connectivity at step 322 as new media devices acquire or release media services 210. If the QoS is unacceptable, for example, the video quality is below a predetermined threshold, the NC 106 at step 328 can report media devices 108 using media services that exceed an assigned proportion of network capacity provisioned by the ISP 110. For instance, the ISP 110 may only provide a bandwidth of 3 Mbps, though the aggregated bandwidth usage in the residence 102 by all the media devices 108 is 4 Mbps. In such regard, the QoS decreases since the network load is greater than network bandwidth capacity. The GUI 400 by way of the Warnings window 430 can identify the media devices 108 that consume more than a provisioned amount.

More specifically, the NC 106 can assess a network loading associated with providing media services to the media devices 108, evaluate a network capacity provisioned by an Internet Service Provider (ISP) 110, and report a Quality of Service (QoS) based on the network loading and the network capacity. The GUI 400 can display a report card 440 that lists the existing media services for all the media devices 108 in the media network 100, or that identifies media devices 108 with corresponding performance ratings (e.g., good, average, poor). The GUI 400 can also show bandwidth utilization 430 in the media network 100 versus bandwidth capacity provisioned to the network by the one or more ISPs 110. The report card 440 can order the media services 210 by QoS (e.g., high, average, low), bandwidth utilization, security, or any combination thereof.

At step 330, the NC 106 can transmit a warning to media devices 108 in the media network 100 that exceed a provisioned resource use, such as an assigned maximum bandwidth. The NC 106 can send a text message, or notification, to a media device 108 to inform the user that the media device 108 exceeds an allocated average bandwidth usage. The NC 106 can intervene with the media service and terminate the media service 108 if necessary to balance network resources between media devices 108. The NC 106, by way of the warning window 430 in the GUI 400, can also evaluate media resource consumption in the media network 100 and inform the user of media resources (e.g., bandwidth) provisioned by the ISP 110. For example, the warning window 430 can indicate that the media devices 108 in the residence 102 consume 4 Mbps, though the ISP 110 provides only 3 Mbps. Moreover, the NC 106, by way of the GUI 400, can identify the ISPs that are providing inadequate peering of media services (e.g., ISP A provides 1.8 Mb/s of video data from Media Service B).

Upon reviewing the aforementioned embodiments, it would be evident to an artisan with ordinary skill in the art that said embodiments can be modified, reduced, or enhanced without departing from the scope and spirit of the claims described below. There are numerous configurations for other media services that can be conceived for configuring media resources in a media network that can be applied to the present disclosure without departing from the scope of the claims defined below. For example, the media devices 108 can communicate directly with the media services, thereby bypassing the NC 106, for acquiring and configuring connectivity requests. In such regard, the media device 108 can evaluate the media service connectivity requests and its own capabilities for receiving the media service. The resource management for the media network 100 can be centralized, such as presenting the GUI 400 at a computer which can control resources for other media devices 108. Additionally, any present or media service feature not described herein can be applied in whole or in part to method 300. These are but a few examples of modifications that can be applied to the present disclosure without departing from the scope of the claims stated below. Accordingly, the reader is directed to the claims section for a fuller understanding of the breadth and scope of the present disclosure.

Figure 5:
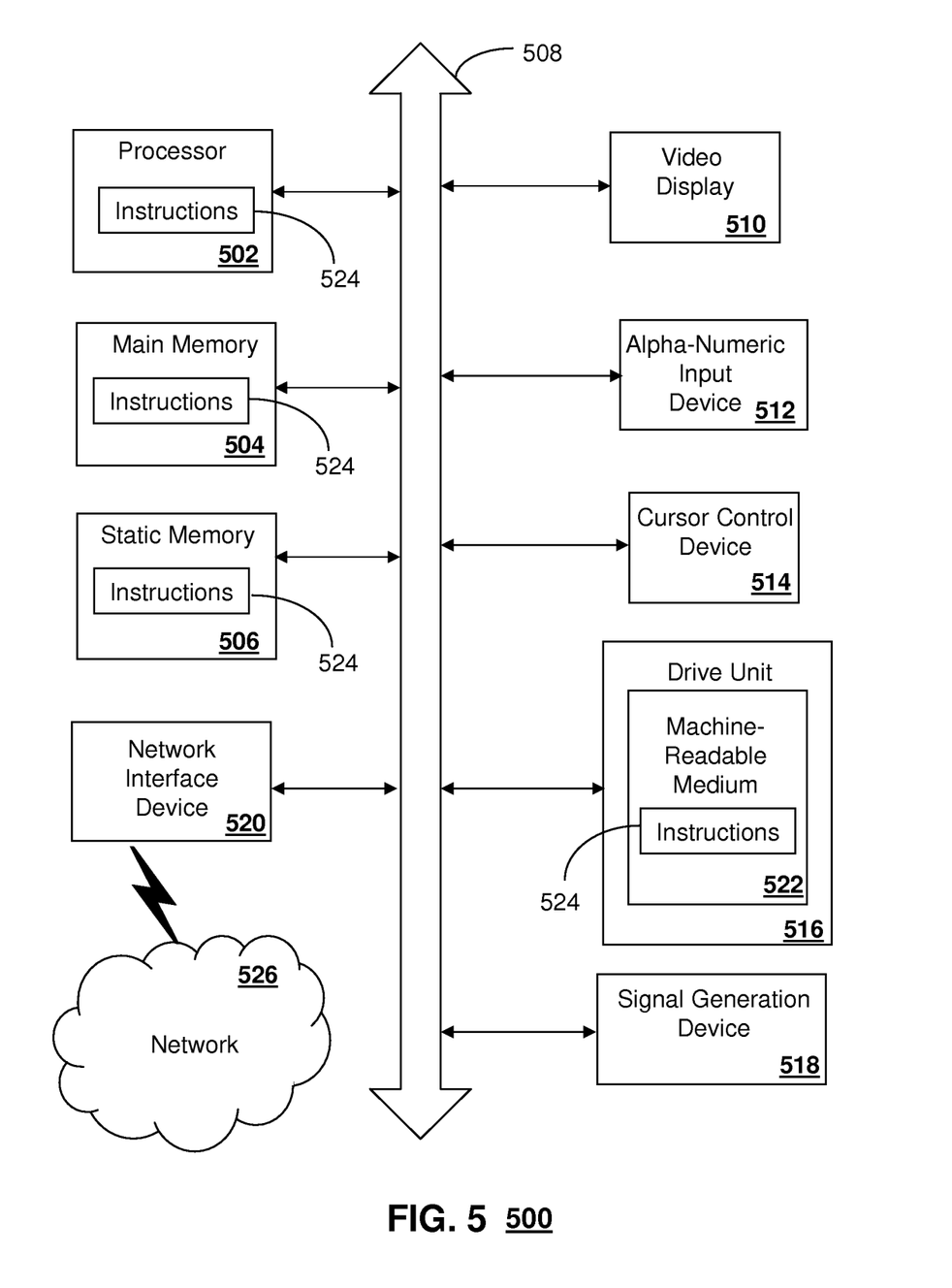
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, responsive to being executed by a processor, cause the processor to perform operations comprising:
   receiving a service resource request for at least one self-describing service provided over a network, wherein connectivity requirements are identified by the at least one self-describing service;
   determining configuration settings for a group of media devices;
   determining corresponding configuration settings available to a plurality of media devices of the group of media devices requesting the at least one self-describing service based at least in part on the connectivity requirements and the determined configuration settings for the plurality of media devices of the group of media devices;
   providing a graphical user interface that identifies the available corresponding configuration settings and that presents one or more media services being delivered to one or more other media devices in the network, wherein the one or more media services are presented in a categorization by at least one of bandwidth, security level, ratings, or preferences;
   receiving from a media device of the plurality of media devices a selection for an applied configuration setting from the available corresponding configuration settings according to the one or more media services that are presented in the categorization;
   configuring a network connectivity of the plurality of media devices according to the applied configuration setting;
   monitoring network resources;
   determining if a quality of service is unacceptable according to the network resources that are monitored;
   transmitting a notice of one or more media devices that exceed a provisioned capacity responsive to determining that the quality of service is unacceptable; and
   managing the network connectivity of the plurality of media devices to receive the at least one self-describing service from a network component in accordance with the applied configuration setting and the monitored media resource consumption.

2. The non-transitory computer-readable storage medium of claim 1, wherein the managing of the network connectivity comprises increasing available bandwidth to a first media device and decreasing the available bandwidth to a second media device.

3. The non-transitory computer-readable storage medium of claim 1, comprising computer instructions which, when executed by the processor, cause the processor to perform operations for receiving self-describing information from the at least one self-describing service, wherein the self-describing information comprises at least one among requirements for bandwidth, port and security.

4. The non-transitory computer-readable storage medium of claim 1, wherein the configuration settings comprise at least one among port settings, bandwidth settings, physical addresses, logical addresses, download settings, or security settings.

5. The non-transitory computer-readable storage medium of claim 4, wherein the graphical user interface presents a list of selectable bandwidths available to the media devices responsive to the at least one self-describing service requesting a bandwidth for delivering the at least one self-describing service.

6. The non-transitory computer-readable storage medium of claim 4, wherein the graphical user interface presents a list of selectable media devices responsive to the at least one self-describing service requesting an address for delivery of the service.

7. The non-transitory computer-readable storage medium of claim 1, wherein the network component is a residential gateway, and further comprising computer instructions which, when executed by the processor, cause the processor to perform operations for terminating the at least one self-describing service to balance network resources among the plurality of media devices.

8. The non-transitory computer-readable storage medium of claim 1, wherein the media device is at least one among a television, cell phone, portable music player, printer, fax machine, or remote controller.

9. The non-transitory computer-readable storage medium of claim 1, wherein the at least one self-describing service is at least one among MP3 audio streaming service, an MPEG video streaming service, a text messaging service, a broadcast service, a video-on-demand service, a pay-per-view service, or a file sharing service.

10. The non-transitory computer-readable storage medium of claim 1, wherein the graphical user interface presents a status window of icons representing the plurality of media devices, wherein the icons identify the configuration settings of the plurality of media devices.

11. The non-transitory computer-readable storage medium of claim 1, comprising computer instructions which, when executed by the processor, cause the processor to perform operations for:
   assessing a network loading associated with receiving the at least one self-describing service;
   evaluating a network capacity provisioned by an Internet Service Provider; and
   reporting the quality of service based at least in part on the network loading and the network capacity.

12. The non-transitory computer-readable storage medium of claim 11, comprising computer instructions which, when executed by the processor, cause the processor to perform operations for:
   determining an effective bandwidth used by the plurality of media devices;
   determining an average bandwidth supplied by the Internet Service Provider; and
   presenting a status window that reports the effective bandwidth, the average bandwidth, and a difference in the effective bandwidth and the average bandwidth.

13. The non-transitory computer-readable storage medium of claim 12, comprising computer instructions which, when executed by the processor, cause the processor to perform operations for accepting, rejecting, or modifying a service request for a network resource.

14. A network element, comprising:
   a memory storing computer instructions; and a controller coupled to the memory, wherein the controller, responsive to executing the computer instructions, performs operations comprising:
    receiving a service resource request for at least one self-describing service provided over a network, wherein connectivity requirements are identified by the at least one self-describing service;
    determining configuration settings for a group of media devices;
    determining corresponding configuration settings available to a plurality of media devices of the group of media devices for receiving a media service;
    providing a graphical user interface to identify the available corresponding configuration settings and to present a quality of service for each of a plurality of services, wherein the one or more media services are presented in a categorization by at least one of bandwidth, security level, ratings, or preferences;
    configuring a network connectivity of the plurality of media devices according to an applied configuration setting that is selected by a media device of the plurality of media devices;
    monitoring network resources;
    determining if a quality of service is unacceptable according to the network resources that are monitored;
    transmitting a notice of one or more media devices that exceed a provisioned capacity responsive to determining that the quality of service is unacceptable; and
    managing a network connectivity of the plurality of media devices in the network to receive the at least one self-describing service in accordance with a selection of the available configuration settings and the monitored media resource consumption.

15. The network element of claim 14, wherein the controller, responsive to executing the computer instructions, performs operations comprising identifying connectivity requests of the at least one self-describing service offered to the plurality of media devices in the network, wherein the available corresponding configuration settings are associated with the connectivity requests.

16. The network element of claim 14, wherein the at least one self-describing service provides self-describing information comprising at least one among requirements for bandwidth or security, and wherein the managing of the network connectivity comprises opening a socket stream connection based on the selection of the available corresponding configuration settings, increasing available bandwidth to a first media device and decreasing the available bandwidth to a second media device.

17. The network element of claim 14, wherein the managing of the network connectivity comprises increasing available bandwidth to a first media device and decreasing the available bandwidth to a second media device.

18. The network element of claim 14, wherein the plurality of services includes the at least one self-describing service, and wherein each of the quality of services are listed in order based on quality.

19. The network element of claim 18, wherein the configuration settings comprise at least one among port settings, bandwidth settings, physical addresses, logical addresses, download settings, or security settings, and wherein the graphical user interface identifies a performance rating for each of the plurality of media devices.

20. The network element of claim 14, wherein the self-describing service is at least one among an audio streaming service, a video streaming service, a text messaging service, a broadcast service, a video-on-demand service, a pay-per-view service, or a file sharing service.

21. A media device comprising:
    a memory storing computer instructions; and
    a controller coupled to the memory, wherein the controller, responsive to executing the computer instructions, performs operations comprising:
    presenting a graphical user interface to identify configuration settings associated with a connectivity of a self-describing service available over a network to a plurality of media devices including the media device and to present one or more media services being delivered to one or more other media devices in the network, wherein the one or more media services are presented in a categorization by at least one of bandwidth, security level, ratings, or preferences, wherein a service resource request is presented by the self-describing service, and wherein connectivity requirements are identified by the self-describing service, wherein the configuration settings are determined based at least in part on the connectivity requirements and configuration settings information provided by the plurality of media devices;
    receiving a selection of an applied configuration setting for network connectivity according to the categorized one or more media services; and
    receiving a notice that the media device exceeds a provisioned capacity responsive to determining that a quality of service is unacceptable based on a monitoring of network resources.

22. The media device of claim 21, wherein the controller, responsive to executing the computer instructions, performs operations comprising
    managing the connectivity of the media device to receive the self-describing service in accordance with the selected configuration setting.

23. The media device of claim 22, wherein the managing of the connectivity comprises increasing available bandwidth to the media device.

24. The media device of claim 21, wherein the controller, responsive to executing the computer instructions, performs operations comprising receiving self-describing information from a self-describing server comprising at least one among requirements for bandwidth, port or security.

25. The media device of claim 21, wherein the configuration settings comprise at least one among port settings, bandwidth settings, physical addresses, logical addresses, download settings, or security settings.

26. The media device of claim 21, wherein the media device is at least one among a television, cell phone, portable music player, printer, fax machine, or a remote controller for controlling media presented at the media device.

27. A method for configuring media network resources, the method comprising:
    identifying, by a system comprising a processor, connectivity requirements for presentation of a self-describing service that is provided over a network, wherein the connectivity requirements are presented in a service resource request by the self-describing service;
    determining, by the system, configuration settings of the media network resources that at least in part satisfy a portion of the connectivity requirements to identify available configuration settings;
    presenting, by the system, a graphical user interface to identify the available configuration settings and to present one or more media services being delivered to one or more other media devices in the network, wherein the one or more media services are presented in a categorization by at least one of bandwidth, security level, ratings, or preferences;

receiving, by the system, a selection of an applied configuration setting from the available configuration settings according to the presented categorization;

monitoring, by the system, network resources;

determining, by the system, if a quality of service is unacceptable according to the network resources that are monitored; and transmitting, by the system, a notice of one or more media devices that exceed a provisioned capacity responsive to determining that the quality of service is unacceptable.

28. The method of claim 27, comprising:

applying, by the system, the selection to the media network resources to connect with the self-describing service in accordance with the applied configuration setting.

29. The method of claim 28, wherein the selection for the applied configuration setting comprises increasing available bandwidth to a first media device and decreasing the available bandwidth to a second media device.

30. The method of claim 27, comprising receiving, by the system, self-describing information from the self-describing service, wherein the self-describing information comprises at least one among requirements for bandwidth, port or security.

31. The method of claim 27, wherein the configuration settings comprise at least one among port settings, bandwidth settings, physical addresses, logical addresses, download settings, or security settings.

* * * * *